United States Patent [19]

Timpe et al.

[11] Patent Number: 4,578,887
[45] Date of Patent: Apr. 1, 1986

[54] METHOD AND APPARATUS FOR EXAMINING DOCUMENTS

[75] Inventors: Gerald M. Timpe; Terry Deville, both of Houston, Tex.

[73] Assignee: Diagnostic Products, Houston, Tex.

[21] Appl. No.: 554,395

[22] Filed: Nov. 22, 1983

[51] Int. Cl.⁴ ............................................. G02B 27/02
[52] U.S. Cl. ......................................... 40/361; 40/471; 40/518
[58] Field of Search .................. 40/361, 347, 385, 471

[56] References Cited

U.S. PATENT DOCUMENTS

| | | | |
|---|---|---|---|
| 1,553,302 | 9/1925 | Allatt | 40/471 |
| 2,002,867 | 5/1935 | Powers | 40/361 |
| 2,782,538 | 2/1957 | Perretti | 40/471 |
| 3,120,066 | 2/1964 | Reeves | 40/471 |
| 3,362,094 | 1/1968 | Mellander | 40/361 |

FOREIGN PATENT DOCUMENTS 1084264  9/1967  United Kingdom ................. 40/361

Primary Examiner—Gene Mancene
Assistant Examiner—Wenceslao J. Contreras
Attorney, Agent, or Firm—Carwell & Helmreich

[57] ABSTRACT

Improved apparatus is provided for examining large quantities of documents and, particularly, x-rays, positioned in front of a viewing station. The present invention utilizes an elongate sheet of plastic which can be power controlled to move in a generally horizontal direction across the viewing station. In the area of the viewing station, the plastic sheet is tilted backward, so that gravity assists in retaining the documents on the plastic sheet. Novel means are provided for retaining the film on the plastic sheet between the idler rollers and drums. Improved methods are disclosed herein for viewing large quantities of documents such as x-rays.

20 Claims, 6 Drawing Figures

METHOD AND APPARATUS FOR EXAMINING DOCUMENTS

BACKGROUND OF THE INVENTION

Various types of apparatus have been devised for assisting in the viewing of large quantities of flat objects, such as films, photographs, drawings, or printed material. The need for such apparatus for viewing x-rays is widely known and recognized, as described in U.S. Pat. Nos. 3,246,412; 3,362,094; and 2,002,807, which are hereby incorporated by reference in their entirety into the present application.

A good deal of prior art exists merely in the types of frames, mounts, or assemblies for holding documents such as x-ray films to facilitate viewing. Much of that prior art, however, is specifically directed to frames or mounts designed to hold a plurality of films, with each film having the same basic dimensions. Examples of such prior art may be found in U.S. Pat. Nos. 3,559,320; 3,347,134; 3,336,690; 2,842,882; 3,981,092; 2,234,427; 3,831,301; 4,110,924; 4,112,165; and 4,146,985. Obviously, a good deal of effort has therefore been expended in providing a better frame or mount for assisting in the viewing of x-ray films.

With respect particularly to the apparatus or assemblies other than frames or mounts devised to assist in the viewing of x-rays, several patents generally depict such devices, but are in many respects dissimilar to the apparatus of the present invention. Such prior art apparatus may be relatively simple in design and construction, e.g., U.S. Pat. Nos. 4,118,654; 4,004,360; 3,896,603; 4,152,852; and 4,373,280, but such prior art apparatus is not well suited for viewing x-ray films on a large scale basis, and particularly when such films are of different dimensions. On the other hand, prior art apparatus may be complex in design and construction, e.g., U.S. Pat. Nos. 3,359,669 and 3,201,883, and thus such apparatus has not been widely accepted in the industry. Devices have been also patented for viewing x-ray film which utilize a magazine to move the x-rays past a stationary light source. Examples of assemblies utilizing the movable magazine concept are U.S. Pat. Nos. 3,246,412 and 3,541,711.

The prior art also includes U.S. Pat. Nos. 3,362,094; and 2,002,867, which are directed to the concept of mounting x-rays on a plastic strip or sheet, and then rolling and unrolling such plastic in the manner of a scroll to pass the x-rays past a viewing station. Both of these latter patents are directed to such assemblies, and include upper and lower rollers for holding the plastic sheet so that the x-rays can be moved in a generally vertical direction to pass by the viewing area.

The need exists for improved apparatus for efficiently viewing a plurality of x-rays, wherein particular x-rays can be easily and quickly added or removed from the viewing device. Much of the prior art apparatus requires too much time and difficulty to add or remove particular x-rays from the veiwing machine.

The apparatus of the prior art is also generally not well adapted for mass viewing of x-rays having various sizes or dimensions. In many instances, the radiologist desires to simultaneously view a number of x-rays, and the x-rays have been obtained from different machines which produce x-rays of different sizes, or certain x-rays have been reduced or enlarged. Many of the prior art assemblies referred to above are either incapable of viewing various size x-rays or are not well suited for viewing x-rays of different sizes.

When viewing x-rays, radiologists often prefer to have x-rays moving horizontally or laterally across the viewing area rather than vertically. Also, apparatus exists in the prior art for viewing x-rays placed on an elongate sheet of plastic adapted for moving in the horizontal direction, but such apparatus commonly also employs guide wires or elastic bands which run across the x-rays and thus detract from the clarity of the entire x-ray.

The disadvantages of the prior art are overcome by the present invention, and improved methods and apparatus are provided for viewing documents such as x-rays which can be mounted on a transparent sheet of plastic which is horizontally movable across a viewing area. The present invention is particularly well adapted for use with apparatus comprising a pair of drums on either side of the viewing area so that the sheet of plastic with the x-rays can be unrolled from one drum while simultaneously rolled on another drum as the sheet of plastic passes the viewing area.

SUMMARY OF THE INVENTION

The apparatus of the present invention comprises an elongate sheet of plastic capable of retaining a plurality of documents of various dimensions, such as x-rays. A pair of drums are provided each positioned on one side of the viewing screen, so that the x-rays can be moved horizontally past the viewing area in the manner of a scroll. To facilitate inspection of the entirety of each x-ray, the transparent sheet of plastic is tilted backward, and gravity assists in retaining the x-ray on the sheet of plastic when passing through the viewing area. Means are also provided for retaining the x-rays on the plastic sheet in the area adjacent the pair of drums.

According to the method of the present invention, various sized x-rays may be placed on the tilted elongate sheet of plastic, with a lower lip of the plastic sheet and gravity assisting in retaining the x-rays in place on the plastic sheet. Methods are employed for retaining the x-rays on the plastic sheet in area adjacent the pair of drums.

It is a feature of the present invention to provide improved apparatus for viewing documents utilizing an elongate pliable material horizontally movable past a viewing station.

It is a further feature of the present invention to provide improved apparatus for simultaneously viewing documents of various sizes.

It is another feature of the present invention to provide improved means for retaining documents on a horizontally movable, pliable member without obstructing the view of the documents.

Still another feature of the present invention is to provide novel means for retaining documents on a generally horizontally movable screen in the area brtween the screen idler rollers and the drums.

It is a further feature of the present invention to provide improved apparatus for viewing documents of various sizes, wherein particular documents can be quickly and efficiently added and removed from the apparatus.

It is another feature of the present invention to provide improved methods for simultaneously viewing documents of various sizes.

It is a feature of the present invention to provide improved apparatus for examining documents, including a pliable elongate sheet for carrying the documents and capable of moving in a horizontal direction past a viewing area, the improvement comprising first and second vertically inclined take-up means capable of rotating to move a portion of the elongate sheet past the viewing area, first and second vertically inclined guide means for positioning the plastic sheet in a single backwardly inclined plane, and retaining means for retaining the documents on the elongate sheet when moving between the take-up means and the guide means.

It is a further feature of the present invention to provide a method for viewing documents comprising placing a plurality of documents on a vertically tilted pliable material and moving such material substantially horizontally across a viewing station while simultaneously unrolling a portion of pliable material from one drum and rolling another portion of pliable material on another drum.

It is a further feature of the present invention to provide improved methods for retaining documents on an elongate pliable material in the area adjacent the drums.

These and other features and advantages of the present invention will become apparent from the foregoing detailed description, wherein reference is made to the Figures in the accompanying drawings.

DETAILED DESCRIPTION OF THE INVENTION

Figure 1:
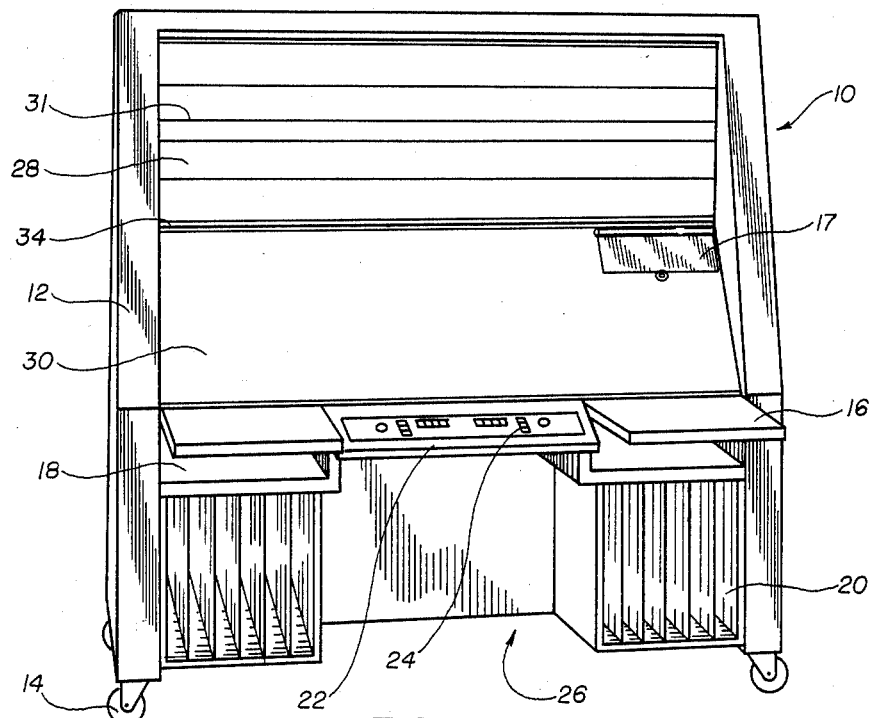
FIG. 1 is a front pictorial view of the apparatus according to the present invention.

According to the present invention, apparatus is provided for viewing a plurality of documents, comprising a pair of drums on each side of the viewing station, the documents being held in place by an elongate pliable material which horizontally moves past the viewing station by unwrapping from one drum or roller while wrapping onto another drum or roller. Such apparatus is particularly useful to radiologist and doctors for viewing x-rays, and will be generally described hereafter as apparatus for viewing x-rays.

As previously indicated, many document viewing devices have been devised, but are relatively complicated and require a good deal of time and patience to load and unload the x-rays from the device. Also, many devices are not well adapted or are incapable of operation for simultaneously viewing a plurality of substantially different sized x-rays. The increased cost of x-ray material and the desirability of exposing patients to a minimum amount of radiation thus enhances the utility of the device according to the present invention which is capable of use in conjunction with a plurality of substantially different sized x-rays.

Apparatus similar to the present invention has been devised, as previously stated, and can be generally classified as functionally moving the x-rays in a generally vertical direction past a viewing station or functionally moving the x-rays in a substantially horizontal direction past the viewing station. The apparatus of the present invention is of the latter type, and has the following features or advantages over apparatus similar to that described in U.S. Pat. No. 3,362,094, with substantially vertically moving x-rays. First, it is clear that some radiologists prefer to utilize x-ray viewing apparatus having horizontally moving x-rays for possible psychological reasons. When searching for a particular item, people may be more commonly exposed to viewing objects in a substantially horizontal arrangement, compared to viewing the same objects in the substantially vertical arrangement. Thus, the orientation of the apparatus of the present invention with the x-rays adapted to move horizontally across the viewing station may substantially increase the speed of the radiologist in finding a particular x-ray.

Second, the viewing apparatus of the present invention is often used to compare two or more x-rays, and thus it is desirable to have a viewing area be as large as practical while still allowing for maximum comfort to the radiologist. As illustrated by generally comparing FIG. 1 of the present invention with the apparatus shown in U.S. Pat. No. 3,362,094, it may be seen that the radiologist using apparatus having horizontally movable x-rays may generally be capable of viewing a larger viewing area than may be provided by apparatus having vertically movable x-rays. Thus, the apparatus of the present invention having substantially horizontally moving x-rays is clearly distinguished from the apparatus having vertically moving x-rays, and is preferred by many radiologists for ease of comparison.

With regard to the prior art apparatus having horizontally moving x-rays, the apparatus of the present invention has the advantage of not requiring strings, bands, or other elastic material to hold the x-ray in place while passing through the viewing area, yet this apparatus also enables x-rays to be easily and quickly added or deleted from the x-ray viewing apparatus without requiring the use of a complicated holding or fastening device for the x-rays. Prior art apparatus having horizontally moving x-rays typically utilizes wires or bands, as illustrated in U.S. Pat. No. 3,246,412, to maintain the x-rays in place. The use of such wires or elastic bands is disadvantageous for several reasons: (1) the wires make the addition and removal of an x-ray more difficult and time consuming, and (2) the wires obstruct a complete view of the entire x-ray, and thus a particular x-ray may have to be moved so that the desired location on the x-ray may be studied without visual interference from the wires.

Referring now to FIG. 1, there is depicted a pictorial view of the x-ray viewing apparatus 10 according to the present invention. The workings of the apparatus may be housed in a conventional sheet metal cabinet 12 having conventional reinforcing structural members and, if desired, may be rendered mobile with casters 14. The structure shown in FIG. 1 also may include a horizontal table surface 16, document storage areas 18 and 20, control console 22 having a plurality of control buttons 24, and an operator's area 26 in which a radiologist may stand or be seated while viewing x-rays.

The apparatus as shown in FIG. 1 includes two distinct viewing areas or screens: the substantially vertical screen 28, and a slanted screen 30 according to the concept of the present invention. As discussed subsequently, the upper viewing screen 28 may be used in conjunction with strings or bands 31 which assist in holding the x-rays in place, while no strings or bands are provided for the lower screen 30. Each viewing area 28 and 30 may be separately controlled, so that x-rays may move in either direction on either screen simultaneously or independently of x-ray movement on the other screen. The two viewing areas 28 and 30 are joined at the substantially horizontally structural member 34 secured to the cabinent 12.

Referring generally to the apparatus described in FIG. 1, it is within the concept of the present invention to provide an x-ray viewing apparatus having one or more slanted viewing areas, e.g., 30, as further described below. Although apparatus having only a substantially vertical screen 28 with wires 31 is known in the prior art, the combination of substantially vertical screen 28 and a slanted screen 30 as described herein is novel. It is also within the concept of the present invention to provide merely one slanted viewing area, such as viewing area 30, so that the top of the cabinet may generally coincide with the structural member 34.

Two or more distinct slanted viewing areas may also be provided according to the present invention, with or without the addition of any substantially vertical viewing area. It may be understood, however, that if the substantially vertical viewing area 30 as shown in FIG. 1 were to be replaced with a tilted viewing area, a radiologist seated at location 26 may have some difficulty viewing the upper slanted viewing area, and may have to stand to properly view x-rays in the upper slanted viewing area. For this reason, it is a particular feature of the present invention to provide a lower slanted viewing area 30, and, if a second upper viewing area is desired, the upper viewing area may be similar to a conventional substantially vertical viewing area which may be easily viewed by a seated radiologist. With respect to the single or lower viewing area 30, it is another advantage of the present invention that this screen is tilted with the upper portion of the screen 30 being further away from the radiologist than the lower portion of the screen, which is generally the more conventional orientation for viewing a document. In other words, persons viewing a document typically would not hold the document vertically in front of them, but generally would tilt the document at least slightly so that to some extent they are looking downwardly when viewing the document. Also, the slanting of the screen 30 may reduce or eliminate glare on the screen 30 and thus reduce the radiologist eye strain.

Figure 2:
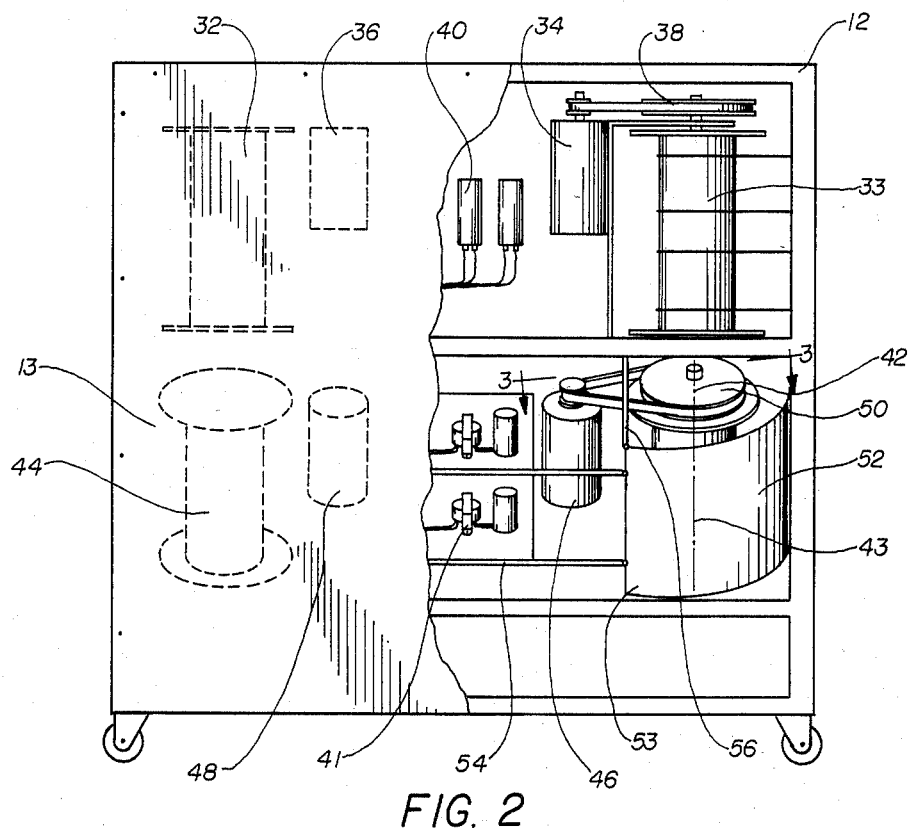
FIG. 2 is a back view of the apparatus shown in FIG. 1, with a portion of the back panels removed.

Referring now to FIG. 2, there is depicted a back view of the apparatus shown in FIG. 1. The cabinet 12 includes a sheet metal back 13, which has been partially removed for clarity of the internal components. It should be understood that the hardware and electronic apparatus for the upper viewing area may be duplicated in the lower viewing area, and visa-versa, although for ease of explanation and simplification of the drawings such apparatus may only be shown and discussed for one of the two viewing areas. Referring first to the hardware related to the vertical upper viewing area 28, there is provided a pair of drums 33 and 32, each respectively powered by motors 34 and 36. Each motor is connected to its respective drum by conventional gearing apparatus or pulley and belt mechanism 38. Conventional electrical apparatus for powering the motors 34 and 36 is depicted at 41.

As will be explained further below, simultaneous operation of the motors 34 and 36 causes simultaneous rotation of the drums 33 and 32 to move the plastic sheet (not depicted in FIG. 2) past the viewing area in a manner similar to the operation of the scroll. Thus, the plastic sheet holding a plurality of x-rays is moved past the upper viewing area 28 by rotation of the drums 33 and 22, with the x-rays being at least partially held in place by the elastic bands 31. Preferably, the bands 31 are adjacent the entire length of the plastic sheet, so that the wires are also rolled and unrolled from the drums with the plastic sheet. X-rays on the plastic sheet may thus pass by the viewing area, be redirected by an idler roller (not depicted in FIG. 2), and thereafter continue to be wound onto the particular drum serving as the take-up drum.

Since the plastic sheet remains substantially vertical during the rolling and unrolling operations, and since the elastic bands 31 pass with the plastic sheet, the x-rays placed on the plastic sheet for the apparatus described above may also be rolled and unrolled from the drums with little or no more tendency for the x-rays to fall off the plastic sheet when in the area adjacent the drums than when passing by the viewing screen.

Preferably, tension is maintained on the plastic sheet at all times, and this may be accomplished when the plastic sheet is not moving by continually applying a small amount of voltage to both DC motors 34 and 36 anytime the apparatus 10 is operational. When the plastic sheet is moving, a larger amount of voltage is applied to the motor driving the drum serving as the take-up drum, while the motor driving the trailing drum may be shunted to provide drag. The motors 34 and 36 are wired to run in opposite directions, and the plastic sheet may thus be selectively moved back and forth across the viewing area by applying voltage to either of motors 34 and 36.

Referring now to the hardware connected with the tilted screen 28, there is depicted in FIG. 2 a pair of drums or take-up means 42 and 44 similarly powered by a pair of motors 46 and 48 as described above, with conventional transmission units 50 connecting each motor with its respective drum. Each motor may be conventionally mounted relative to the cabinent 12, and the rollers and drums as described herein preferably include conventional bearing assemblies for ease of rotation. The lower plastic sheet (not depicted in FIG. 2) is tilted, however, so that a tilted pair of idler rollers (not depicted in FIG. 2) direct the plastic sheet onto and off the tilted drums 42 and 44. In other words, the smooth operation of the tilted plastic sheet is obtained since each portion or section of the plastic sheet remains substantially aligned from the top of the plastic sheet to the bottom of the plastic sheet with the angle of the plastic sheet when passing through the viewing area 28. If the plastic sheet in the viewing area 28 were tilted backward (with respect to the radiologist) at an angle of 20°, the axis 43 of each of the drums 42 and 44 would preferably similarly be tilted backward at an angle of approximately 20°. Also, FIG. 2 generally depicts electrical apparatus 40 for powering the light source described hereafter.

FIG. 2 also depicts one embodiment of a portion of a guide means or retaining means 52 for retaining the x-rays on the plastic sheet, as will be more fully understood subsequently. For the present, it should be understood that the diameter of the plastic sheet on each drum will vary; as one increases, the other will decrease. It may be preferable that the guide means 52 be movable relative to the axis 43 of each of the drums 42 and 44. For that purpose, the end 53 of the guide means may be vertically held in place by one or more elastic bands 56, and the guide means (not depicted) for the drum 44 may be connected to the guide means 52 of the drum 42 by one or more plastic bands 54. The plastic bands therefore enable corresponding movement of the guide means so that the end of the guide means may move closer to the axis 43 as its respective drum unwinds, and the guide means may move away from the axis 43 as its respective drum is wound with the plastic sheet.

Figure 4:
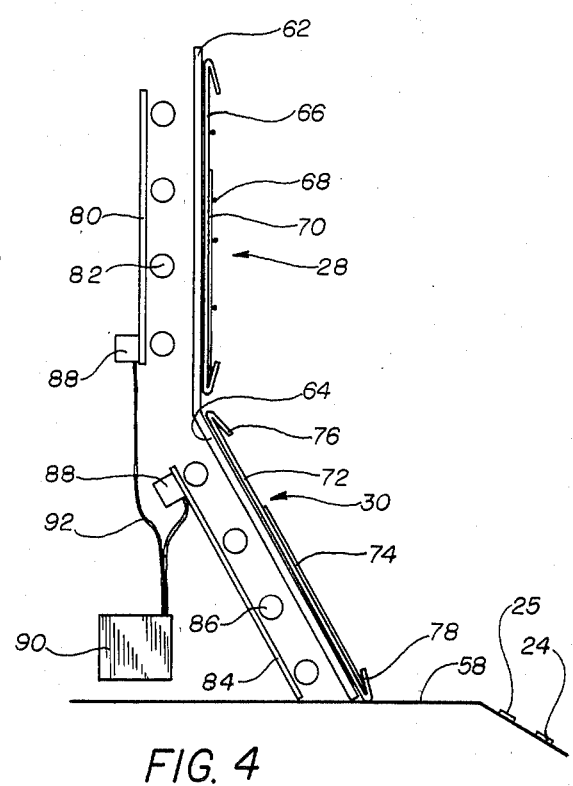
FIG. 4 is a simplified side view of a portion of the apparatus shown in FIGS. 1 and 2.

Referring to FIG. 4, there is depicted a cross-sectional view of a portion of the apparatus shown in FIGS. 1 and 2, with much of the hardware removed for clarity of the components illustrated in FIG. 4. For comparison purposes, it should be understood that the horizontal surface 58 shown in FIG. 4 is at the same of push button controls 24 may be mounted to the control panel 22 as previously described.

FIG. 4 depicts the upper viewing area 28 and the lower tilted viewing area 30. Both the upper plastic sheet 66 and the lower plastic sheet 72 may pass over a transparent sheet of opal glass or opalized Plexiglass 62 and 64, respectively, with the height and width of each glass 62 and 64 approximating the size of the respective viewing area. The apparatus described herein may be referred to as back-lighted apparatus in that a light source 80 including a plurality of light bulbs 82 is behind the glass 62, and similarly a light source 84 with bulbs 86 is behind the glass 64. If desired, a light source for the lower viewing area may be tilted at the same approximate angle as the angle of the glass 64. Preferably, the bulbs 86 are fluorescent light bulbs, which may be arranged either vertically or horizontally behind the glass. elevation as the top of the table 16, and that a plurality Referring first to the tilted plastic sheet 72, the plastic sheet includes an upper fold 76 and a lower fold 78 forming a trough for receiving the bottom of a typical x-ray 74. It may be seen that the plastic sheet 72 is capable of holding a plurality of x-rays of different sizes, since only the lower fold 78 and gravity are required to retain the x-rays on the plastic sheet when in the viewing area. The fold 76 at the top of the plastic sheet allows for uniformity of diameter (top to bottom) as the plastic sheet is rolled onto the drum, and may also serve as a retaining means for the top of the highest x-ray to be viewed.

In the upper viewing area, it should now be understood that the elastic bands 68 are necessary to hold the x-rays on the plastic sheet 66, while no such elastic bands or other similar visual obstructions are required to hold the x-rays on the tilted plastic sheet 72. An x-ray on the plastic sheet would tend to drop off a plastic sheet, especially when the plastic sheet is accelerating, deccelerating, or moving at a constant velocity in response to controlled activation by the radiologist. It has been found that the combination of gravity and the lower fold of the plastic sheet will adequately retain x-rays on the plastic sheet when in the viewing area, even when the above conditions occur, if the plastic sheet is tilted backwards 15° or more, and preferably approximately 25° or more. Additional tilting of the plastic sheet may make viewing by the radiologist more difficult, and decreases the remaining volume within the cabinent 12. Considering the above factors, it has been determined that a preferred angle of the tilted plastic sheet 72 is between 15° and 35°, and preferably between 20° and 30°.

Figure 3:
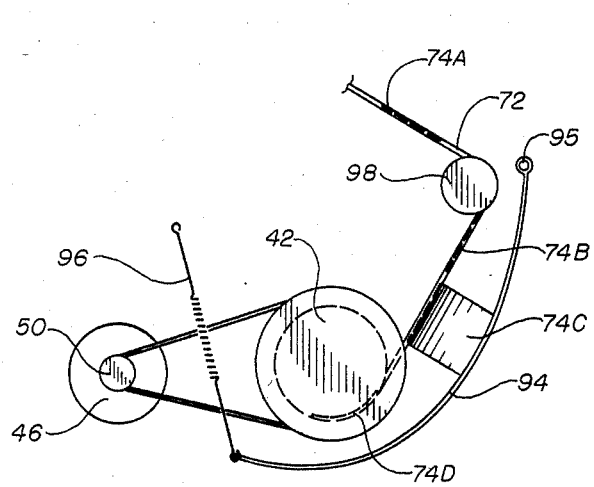
FIG. 3 is a top view of a portion of the apparatus shown in FIG. 2.
Figures 5, 6:
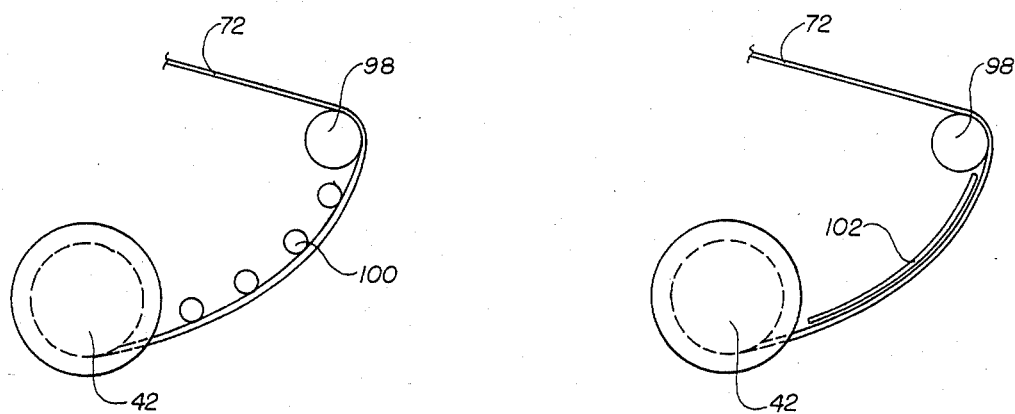
FIGS. 5 and 6 are alternate embodiments of the apparatus depicted in FIG. 3.

Referring now to FIG. 3, there is depicted a motor 46, a tilted drum 42, and transmission means 50 as previously described. The illustrations in FIGS. 3, 5, and 6 are each taken looking directly down the axis 43 of the drum 42, so that if the plastic sheet 72 was tilted backward 25° when passing through the viewing area 30, the illustrations shown in FIGS. 3, 5, and 6 would similarly be taken looking down at the apparatus depicted at the same 25° backward tilted angle. With respect to FIGS. 3, 5, and 6, components similar to that previously described are illustrated by reference numerals corresponding to such similar components.

FIG. 3 depicts an alternate embodiment of the guide means 52 shown in FIG. 2 for retaining the x-rays on the plastic sheet 72 when in the location between the idler roller 98 and the drum 42. Assuming that the motor 46 in FIG. 3 is activated to power the drum 42 to wind the plastic sheet 72 onto the drum, it should be understood that the plastic sheet 72 will move past the viewing area 30, to be redirected by the idler roller 98 (this idler roller was previously discussed, but not illustrated), and then be wrapped onto the drum 42.

It may now be understood that if the plastic sheet 76 in the viewing area were tilted backward at 25°, the x-ray 74A shown in FIG. 3 would similarly be in the 25° backward tilt angle. The x-ray 74B has passed the roller 98, and is no longer at the backward tilt 25° angle with respect to gravity. It is clearly possible, of course, that this change in the angle of the x-ray 74B may not cause the top of the x-ray 74B to disengage from the plastic sheet. It is also possible, however, for such disengagement to occur, as shown by the x-ray 74C wherein the bottom of the x-ray remains substantially in the trough formed by the fold 78, but the top of the x-ray has disengaged from the plastic sheet. When an x-ray reaches the position of the x-ray 74D, gravity is increasing the likelihood that the top of the x-ray will disengage from the plastic sheet since the previously described "backward" angle of the x-ray at location 74A may have changed to a slightly "forward" angle. Although gravity would otherwise tend to make the top of the x-ray 74D disengage from the plastic sheet, x-ray 74D may be held in place (or brought back in place with the top of the x-ray in engagement with the plastic sheet) because the x-ray becomes substantially less flimsy once the x-ray is curved or folded by the contour of the drum 42.

Referring to FIGS. 2 and 3, it should now be understood that the particular angle of an x-ray spaced between the idler roller and the drum will depend on several factors, including the angle of the plastic sheet when in front of the viewing station, the position of the drum relative to the roller (or stated differently, the angular redirection of the plastic sheet caused by the roller, the amount of plastic sheet wrapped on the drum, and the position of the x-ray relative to the drum/roller spacing. FIG. 3 depicts the arrangement of components in a manner that the idler roller 98 redirects the plastic sheet through an angle of approximately 90°. Clearly, the components could be arranged so that this redirected angle were more or less than 90°, although the redirection shown in FIG. 3 has been found generally satisfactory from the standpoint of keeping the plastic sheet in a single plane when passing through the viewing area and minimizing the space requirements for these components. Thus, it is not essential to the present invention that x-rays be at a slightly "forward" angle between the idler roller and the drum, since x-rays may also otherwise fall from the plastic sheet when positioned between the idler roller and the drum if this angle were "neutral" or even if slightly "backward".

In FIG. 3, it may thus be seen that guide means 94 is utilized to keep the x-ray from falling off the plastic sheet in the location generally between the idler roller 98 and the drum 42. If the top of the x-ray, e.g. 74C, disengages from the plastic sheet, it will be brought back into its proper place by the combination of the guide means 94 and the increased rigidity of the x-ray as it becomes rolled about the roller 42. The guide means 94 is substantially similar to the guide means 52 shown in FIG. 2, except that the end 95 is pivotably connected to a holder (not depicted) rigidly secured to the cabinent 12, while the same end of the guide means 52 may be rigidly connected to a similar holder. Also, the bands 54 and 56 shown in FIG. 2 have been replaced with a biasing means such as spring 96, which allows the other end of the guide means to move in a manner previously described as the diameter of the roller changes. Guide means 52 and 94 may be fabricated from a high lubricity sheet of plastic or a plastic coated metal sheet. Each of the guides 52 and 94 preferably do not touch the idler roller 98, but form an outer guide for the x-rays. Of course, a similar guide will generally be provided adjacent the roller 44.

Referring now to FIGS. 1, 2 and 3, it may now be understood that a pair of idler rollers having a substantially vertical axis may be positioned on either side of the upper screen, while a similar pair of tilted idler rollers 98 are positioned on either side of the tilted lower screen. In either case, the idler rollers enable the plastic elongate sheets to continually move in their respective planes, so that the plane of each plastic sheet when passing by the viewing area does not depend on the relative wrappings or any drums. The idler rollers also reduce the width necessary for the cabinet 12 compared to the situation wherein the idler rollers would be eliminated and drums positioned in their stead.

The principal function of the idler rollers is to redirect the path of the moving plastic sheet. This redirection may be approximately 90°, as shown in FIG. 3, but also may be more or less of a redirection. Also, a roller may be utilized to reduce friction, but a smooth guide surface or other conventional mechanical mechanism could be utilized to redirect the path of the plastic sheet so that each portion of the sheet would lie in a substantially single plane when in the viewing area.

FIGS. 5 and 6 depict alternate embodiments of the retaining means 52 and 94 shown in FIGS. 2 and 3, respectively. In FIG. 5, a plurality of elongate rollers 100 are placed so that the plastic sheet 72 is formed in an arc between the idler roller 98 and the drum 42. As previously indicated, the plastic sheet 72 is held under tension by continued force on the drums through the motors, yet the rollers 100 force the plastic sheet to form a curvilinear path between the idler roller 98 and the drum 42. Each of the rollers 100 is preferably spaced apart a distance less than the width of the smallest size x-ray, e.g. 4", and the contoured roll or fold applied to the x-rays by the rollers 100 therefore serves to substantially reduce the flimsiness of the film and thus substantially reduce or eliminate the likelihood that the top of the x-rays would disengage from the plastic sheet at this location between the roller 98 and the drum 42.

The similar characteristic of documents such as x-rays to retain substantial rigidity when rolled or folded explains why the retaining means 102 shown in FIG. 6 also functions to maintain the x-rays on the plastic sheet 72 between the roller 98 and the drum 42. The retaining means 102 has a height approximately the height of the plastic sheet 72, and may be formed from the material similar to that described for the guide 52. Retaining means 102 preferably is formed in a smooth arc shaped configuration commencing adjacent the roller 98 and terminating adjacent the drum 42. Because pressure is continually applied to the drum 42 the plastic sheet 72 is continually in tension, the sheet will stretch across the contoured retaining means 102 in the manner shown. Again, the continued curvature of the x-rays will thus tend to keep the x-rays on the plastic sheet 72. As an alternate arrangement to the retaining means illustrated in FIGS. 5 and 6, it may be understood that a pair of upper and lower curvilinear guide means having a generally slot-shaped cross-sectional configuration may be utilized. The plastic sheet carrying the x-rays would thus ride within the slots, and thus be forced in a curvilinear configuration. Other retaining areas could also be provided, such as movable or stationary plastic retaining bands which extended only in the areas between the idler rollers and their respective drums.

Referring back to FIG. 4, the present invention is preferably provided with an improved lighting system which reduces eye fatigue and headaches for the radiologists. 60 Hz flickers from the fluorescent bulbs 82 may be eliminated by utilizing an power supply 90 which converts conventional AC current to DC current to power the light sources. An inverter ballast 88 for each light source may then be utilized to convert DC current to 25,000 CPS AC current. The ballasts 88 may be of the type sold under the tradename Bodine 24TRS15E, and are electrically connected to the power supply 90 by wiring 92. Eye strain may also be reduced by providing a triac control for the power supply 90 for the light source so that current to the bulbs may be reduced or increased by controlling dimmer switch 25 shown in FIG. 4 to obtain the desired lighting level. Also, a number of positionable shades 17 may be provided as shown in FIG. 1 to block light to the radiologist in areas which temporarily are not covered with an x-ray.

The operation of the apparatus according to the present invention will now be briefly described. A radiologist sitting at station 26 may operate various push button controls 24 to cause each portion of the viewing areas 28 and 30 to become lighted through activation of the bulbs 28 and 26. Thereafter, the motors 34, 36, 46, and 48 may also be energized by similar push button controls 24 in a manner previously described so that both the upper and lower sheets of plastic are moved to their desired positions across the x-ray viewing areas. If the radiologist wishes to study x-rays for a lengthy period of time, the lighting level may be increased or decreased by activating the dimmer control 25 to lessen eye strain. Also, if no x-rays cover a portion of the upper or lower plastic sheets being viewed, the radiologist may selectively pull one or more shades 17 over those blank areas to again reduce eye strain.

X-rays may be deleted from the upper plastic sheet by positioning the x-rays in the viewing area 28, and pulling the x-ray upwardly taking care that the elastic bands 31 are pulled back so as not to damage the x-ray. Similarly, an x-ray can be added to the upper viewing area by pulling the elastic bands 31 backward toward the radiologist, inserting the x-ray behind the wires while lowering the x-ray, and then releasing the wires slowly to hold the x-ray in place on the plastic sheet.

With respect to the lower plastic sheet, the above operation is simplified since an x-ray can be removed by simply removing the x-ray out of the trough formed by the lip 78. Also, the addition of an x-ray to the screen is much faster and easier than the upper screen since the x-ray can be placed on the sheet 72 in a single one-handed operation.

In order to prevent the plastic sheet from becoming completely unwound from either of its drums, a black strip capable of activating a reflective photo sensor may be placed near both ends of the plastic sheet roll. If the black strip were to pass by a selected point adjacent the roll, the photo sensor would be activated thus automatically prohibiting further movement of the roll in a direction which would unwind the plastic sheet.

The present invention has been heretofore described in terms of a back-lighted apparatus. It should be understood, however, that the invention need not be so limited, and that the concepts of the present invention are applicable to a front-lighted device. Thus, the light source could be positioned between the plastic sheet and the radiologist, or may even be positioned behind the radiologist, as would be the case if conventional room lighting were used to study the x-rays. Front lighting would, of course, normally be utilized if the documents to be studied were not at least partially transparent.

A carrier for the x-rays has been described herein as a plastic sheet, which is frequently preferred by radiologist. It should be understood, however, that any pliable material capable of repeatedly winding and unwinding from drums could be used as the carrier. Also, material may preferably be transparent for a back-lighted device, but need not be transparent for use in a front lighted device. Even in a back lighted device, the carrier could be in the nature of a pliable screen with a number of minute apertures, so that functionally the material would appear transparent. Paper and cloth could thus also serve as the carrier material for examining x-rays according to the present invention, and, if desired, the folds 76 and 78 could be fabricated from the same material or could be fabricated from a different transparent or non-transparent material which could then be secured to the carrier material.

According to the present invention, the carrier including the upper and lower folds may be formed from a number of pliable transparent plastic materials. A plastic sheet may, of course, be fabricated according to almost any desired dimensions. In the present case, a plastic sheet approximately 250′ in length and approximately 17¼″ high has been well received by radiologists, since such a sheet is generally capable of holding approximately 200 or more x-rays having a maximum height of 17″. The apparatus according to FIG. 1 would, of course, thus be capable of holding approximately 400 x-rays.

The present invention has been principally described for viewing x-rays. It should also be understood, however, that the invention is not limited to examining x-rays and is capable of use of examining or comparing any number of transparent or non-transparent documents. The only limitation for such documents is that they be sufficiently pliable to wind around rolls or drums in a manner described herein. Thus, the apparatus of the present invention may be used for examining or comparing writings, drawings, graphs, charts, photographs, or other visually perceptible works.

It should also be understood that some of the apparatus described herein is provided for a full understanding of the present invention, but clearly not as limitations to the present invention. By way of example, any number of conventional drive means could be used to power the drums to wind and unwind the pliable elongate material for holding the documents, or the drums could be manually rotated by the operator. Also, various types of hand-operated or foot-operated buttons, controls, or switches may be used to activate the lighting system or the drive means according to the present invention.

It is therefore apparent that the present invention is one well adapted to obtain all of the objects and advantages herein set forth, together with other advantages which will become obvious and inherent from the description of the method and apparatus themselves. It should be understood that certain combinations and subcombinations are of utility and may be obtained without reference to other features and subcombinations. This is contemplated by and is within the scope of the present invention.

What is claimed is:

1. An apparatus for examining various sized x-rays, including a light-permeable plastic elongate sheet for carrying said x-rays and capable of moving generally horizontally past a viewing area, a light source behind at least a portion of said plastic sheet for illuminating said x-rays when positioned in said viewing area, and a cabinet for housing said plastic sheet and light source, the improvement comprising:

first and second vertically inclined drums each spaced behind and generally toward one side of said viewing area for receiving an end portion of said elongate sheet and for rotating to move a portion of said plastic sheet past said viewing area;

first and second vertically inclined idler rollers spaced adjacent said first and second drums, respectively, for positioning selected portions of said plastic sheet moving past said viewing area in a generally single backwardly inclined plane; and retaining means supported independently of said drums and said plastic sheet for retaining said x-rays on said plastic sheet when moving between one of said drums and its respective idler roller.

2. The apparatus as defined in claim 1, further comprising:

first and second drive means for simultaneously rotating said first and second drums, respectively.

3. The apparatus as defined in claim 1, wherein said plastic sheet comprises:

a lower fold forming a trough for receiving a bottom portion of said x-rays.

4. The apparatus as defined in claim 1, wherein said retaining means comprises:

first and second guards each generally positioned between said first and second idler rollers and said first and second drums, respectively, for limiting movement of the top of said x-rays with respect to said plastic sheet.

5. The apparatus as defined in claim 4, further comprising:

biasing means for allowing movement of said guards relative to the axes of said first and second drums.

6. The apparatus as defined in claim 1, wherein said retaining means comprises:

one or more first and second inclined rollers each positioned between said first and second idler rollers and said first and second drums, respectively, for maintaining said sheet of plastic in a generally curvilinear configuration between said idler rollers and said drums and imparting said curvilinear configuration to said x-rays to maintain the top of said x-rays substantially adjacent said plastic sheet.

7. The apparatus as defined in claim 2, further comprising:
said first and second drive means cooperate to retain tautness in said plastic sheet; and
said retaining means comprises first and second curvilinear guide means each space between said first and second idler rollers and said first and second drums, respectively, for guiding said elongate sheet in a generally curvilinear path between said idler rollers and said drums.

8. The apparatus as defined in claim 1, wherein said light source comprises:
plurality of fluorescent light bulbs; and
dimming means for varying the light intensity of said light source.

9. The apparatus as defined in claim 1, further comprising:
another light-permeable plastic sheet for carrying x-rays and capable of moving in a generally horizontal direction past another viewing area;
third and fourth drums each spaced behind and generally toward one side of said another viewing area for receiving an end portion of said another elongate sheet and for rotating to move a portion of said another elongate sheet past said another viewing area; and
third and fourth idler rollers spaced adjacent said third and fourth drums, respectively, for positioning selected portions of said another plastic sheet moving past said another viewing area in a generally single plane.

10. The apparatus as defined in claim 1, wherein each of the axes of said first and second drums and said first and second idler rollers are tilted backwardly at an inclined angle of between 20° and 30°.

11. An apparatus for examining various sized documents, including a pliable elongate sheet for carrying said documents and capable of moving in a generally horizontal direction past a viewing area, and a cabinet for housing said plastic sheet, the improvement comprising:
first and second vertically inclined take-up means each spaced behind and generally toward one side of said viewing area for receiving an end portion of said elongate sheet and for rotating to move a portion of said elongate sheet past said viewing area;
first and second vertically inclined guide means spaced adjacent said first and second take-up means, respectively, for positioning selected portions of said plastic sheet moving past said viewing area in a generally single backwardly inclined plane; and
retaining means supported independently of said take-up means and said elongate sheet for retaining said documents on said elongate sheet when moving between one of said take-up means and its respective guide means.

12. The apparatus as defined in claim 11, wherein said elongate sheet is a light-permeable sheet having a lower fold forming a trough for receiving a bottom portion of said documents.

13. The apparatus as defined in claim 12, further comprising:
first and second drive means for rotating said first and second take-up means, respectively.

14. The apparatus as defined in claim 12, wherein said retaining means comprises:

first and second guards each generally positioned between said first and second take-up means and said first and second guide means, respectively, for limiting movement of said documents with respect to said elongate sheet; and
biasing means for allowing movement of said first and second guards relative to said first and second take-up means.

15. The apparatus as defined in claim 11, wherein said retaining means comprises:
one or more first and second inclined rollers each positioned between said first and second take-up means and said first and second guide means, respectively, for maintaining said elongate sheet in a generally curvilinear configuration between said take-up means and said guide means and imparting said curvilinear configuration to said documents to maintain the top of said documents substantially adjacent said elongate sheet.

16. The apparatus as defined in claim 11, wherein:
said first and second drive means cooperate to retain tautness in said elongate sheet; and
said retaining means comprises first and second curvilinear guard means each spaced between said first and second take-up means and said first and second guide means, respectively, for guiding said elongate sheet in a generally curvilinear path between said take-up means and said guide means.

17. A method for examining documents placed on a pliable elongate sheet horizontally movable past a viewing area by rotating a pair of a take-up means adapted to receive said plastic sheet, comprising:
positioning said pliable sheet at a backwardly inclined angle in said viewing area;
supporting said documents on said elongate sheet when in said viewing area by a stop carried by said elongate sheet and in engagement with only a bottom portion of said documents;
positioning the axes of each of said take-up means at an angle approximating the angle of said pliable sheet in said viewing area;
altering the path of said plastic sheet between said viewing area and said take-up means while moving said elongate sheet past said viewing area and maintaining said pliable sheet in said viewing area in a generally single backwardly inclined plane; and
maintaining said elongate sheet in a generally curvilinear configuration between said viewing area and a respective take-up means for imparting said curvilinear configuration to said documents to retain said documents on said plastic sheet when moving between said viewing area and a respective take-up means.

18. The method as defined in claim 17, wherein said pliable sheet is angled backwardly and at an inclined angle of between 20° and 30°.

19. The method as defined in claim 17, wherein said elongate sheet is maintained in said curvilinear configuration between said viewing area and a respective take-up means by one or more inclined rollers positioned between said viewing area and said take-up means for rolling engagement with said elongate sheet.

20. The method as defined in claim 17, wherein:
said elongate sheet is light-permeable;
said documents are light-permeable; and
said documents are illuminated in said viewing area by a light source behind said elongate sheet.

* * * * *